United States Patent [19]
Stiller et al.

[11] 3,859,340
[45] Jan. 7, 1975

[54] α-METHYLFLUORENE-2-ACETIC ACID

[75] Inventors: Eric T. Stiller; Seymour D. Levine, both of North Brunswick; Pacifico A. Principe, South River; Patrick A. Diassi, Westfield, all of N.J.

[73] Assignee: E. R. Squibb & Sons, Inc., New York, N.Y.

[22] Filed: Sept. 9, 1970

[21] Appl. No.: 70,913

[52] U.S. Cl. ...... 260/515 R, 260/465 F, 260/465 G, 260/465 R, 260/469, 260/471 R, 260/473 R, 260/515 A, 260/518 R, 260/520, 260/999, 424/317
[51] Int. Cl. ............................................ C07c 63/52
[58] Field of Search ................................ 260/515 R

[56] References Cited
UNITED STATES PATENTS
3,457,300 7/1969 Dorn .................................. 260/515
3,598,867 8/1971 Fouche .............................. 260/515
3,709,994 1/1973 Bencze .............................. 424/317

OTHER PUBLICATIONS

Stephenson; Chemical Abstracts, Vol. 43, p. 7468, (1949).

*Primary Examiner*—Lewis Gotts
*Assistant Examiner*—Dolph H. Torrence
*Attorney, Agent, or Firm*—Lawrence S. Levinson; Merle J. Smith; Donald J. Barrack

[57] ABSTRACT

α-Methylfluorene-2-acetic acid, a novel antiinflammatory agent, is disclosed herein.

1 Claim, No Drawings

α-METHYLFLUORENE-2-ACETIC ACID

This invention relates to new fluorene-2-acetic acid derivatives having the structure

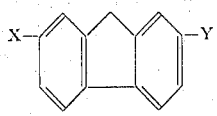

wherein X is hydrogen, lower alkyl, hydroxyl, lower alkoxy, halogen, and trifluoromethyl and Y is

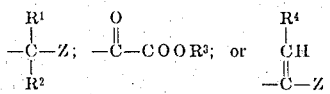

wherein Z is —COOH, —COOR$^5$ or —CN; R$^1$ is hydrogen, hydroxy, lower alkyl or monocyclic cycloalkyl; R$^2$ is hydrogen or alkyl containing from 1 to about 12 carbon atoms or monocyclic cycloalkyl; R$^3$ is hydrogen or lower alkyl; R$^4$ is hydrogen, lower alkyl or monocyclic cycloalkyl; and R$^5$ is lower alkyl, aryl, aralkyl, or a metallic ion where X is hydrogen or chlorine, Y is other than CH$_2$COOH.

Further in accordance with the present invention, a method is provided for treating inflammatory conditions and conditions responsive to treatment with anti-inflammatory agents, which comprises administering an anti-inflammatory amount of the compounds of this invention and also fluorene-2-acetic acid or its 7-chlorinated derivative.

The term "lower alkyl" as employed herein includes both straight and branched chain radicals of up to and including eight carbon atoms, for instance, methyl, ethyl, propyl, isopropyl, butyl, s-butyl, t-butyl, isobutyl, pentyl, hexyl, isohexyl, heptyl, 4,4-dimethylpentyl, octyl, 2,2,4-trimethylpentyl and the like. The lower alkyl group can include substituents such as aryl.

The halogen can be F, Br, Cl or I. However, when X is Cl, Y is other than CH$_2$COOH.

The term lower alkoxy includes straight and branched chain radicals of the structure RO- wherein R includes any of the above lower alkyl groups.

The term "aryl" as employed herein includes monocyclic aryl radicals, for instance, phenyl and substituted phenyl radicals, including lower alkylphenyl, such as tolyl, ethylphenyl, butylphenyl and the like, di(lower alkyl)phenyl (e.g. dimethylphenyl, 3,5-diethylphenyl, and the like), halophenyl (e.g., chlorophenyl, bromophenyl, and 2,4,5-trichlorophenyl) and nitrophenyl.

The term "monocyclic cycloalkyl" includes cyclic radicals containing from 3 to 6 ring members (e.g., cyclopropyl, cyclobutyl, cyclopentyl and cyclohexyl).

Examples of compounds falling within the present invention include, but are not limited to, the following:

(1) 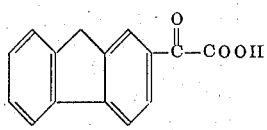

(2) 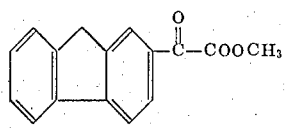

(3) 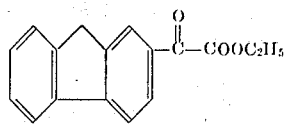

(4) 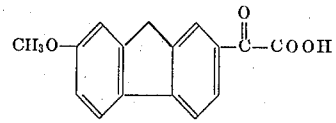

(5) 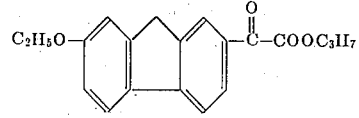

(6) 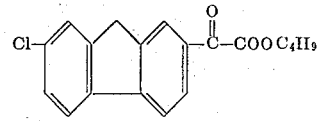

(7) 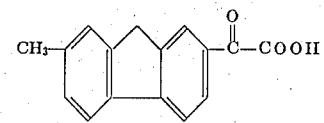

(8) 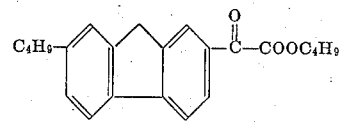

(9) 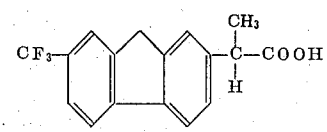

(10) 

(11) 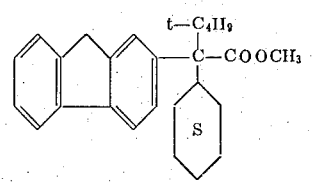

(12) 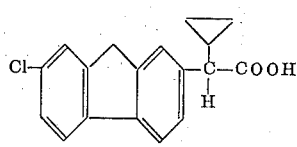

(13) 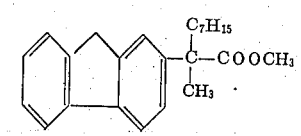

(14) 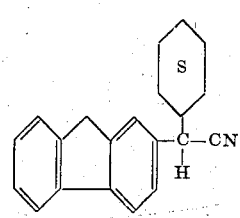

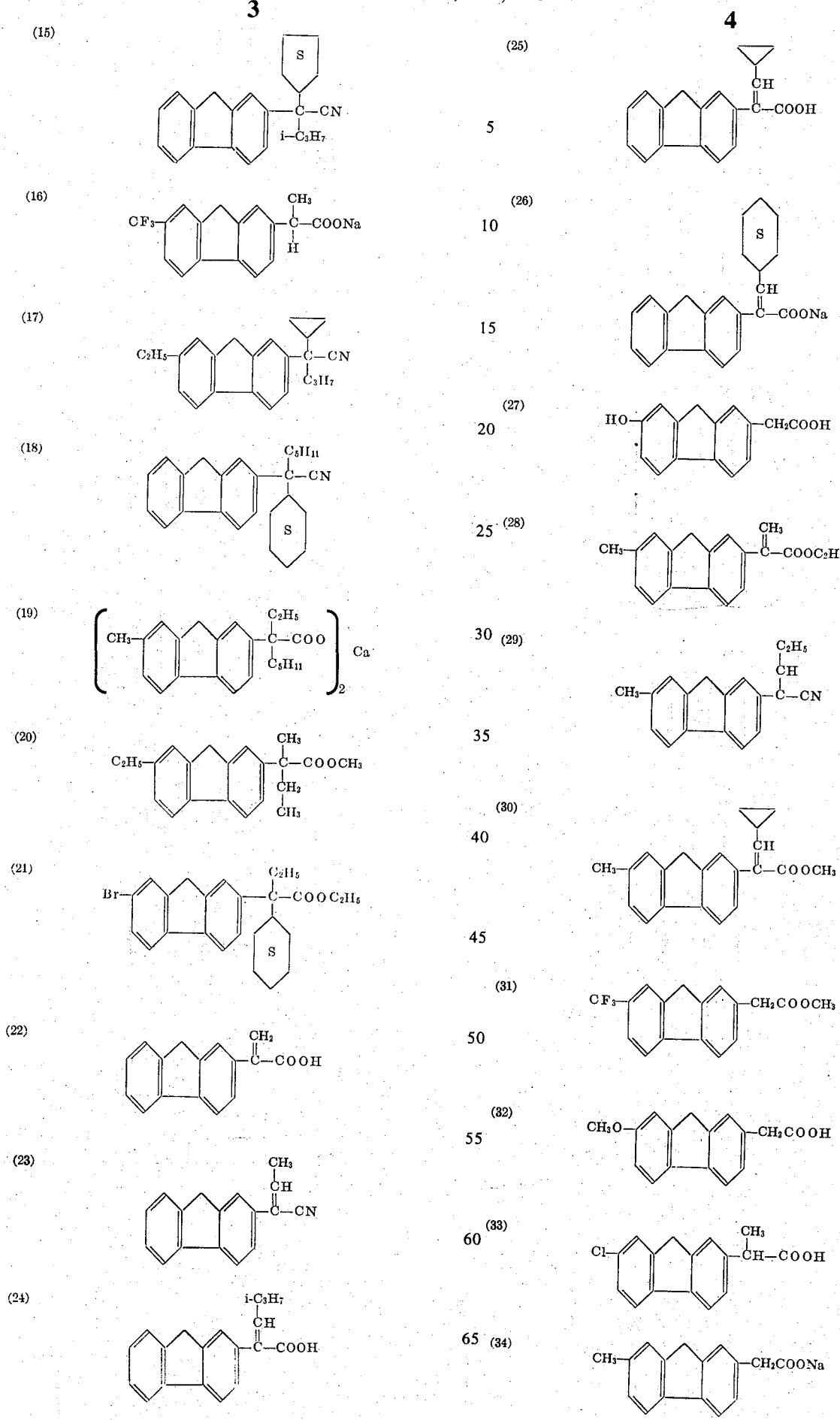

The compounds of formula I wherein Y is

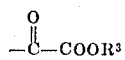

can be prepared by reacting fluorene or a 7-substituted fluorene with a lower alkyl oxalyl halide having the structure II 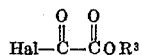

in the presence of a catalyst such as aluminum chloride or other Friedel-Crafts catalyst to form a compound of the structure III 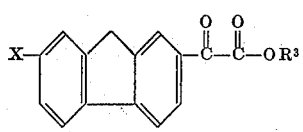

wherein $R^3$ is lower alkyl, such as ethyl. The above reaction is carried out in the presence of an inert solvent such as ethylene dichloride, carbon disulfide, carbon tetrachloride, or petroleum ether, at a temperature within the range of from about $-5°$ to about $+15°$ and preferably from about $5°$ to about $10°$. The fluorene compound is employed in a molar ratio to the oxalyl compound of within the range of from about 0.9:1 to about 0.75:1 and preferably from about 0.9:1 to about 0.85:1.

The $COOR^3$ in compound III wherein $R^3$ is alkyl can be converted to the corresponding carboxyl group to form a fluorene-2-glyoxylic acid by basic hydrolysis, that is by reacting a fluorene derivative of structure III with a base such as an alkali metal or alkaline earth metal hydroxide or alkoxide, such as sodium hydroxide or sodim methoxide, in the presence of an aqueous alcohol containing up to about five carbon atoms, such as methanol or ethanol. These carboxylic acids can be esterified to form the correspondng esters by conventional methods known in the art.

Compounds of the structure I wherein Y is

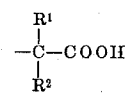

can be prepared by reacting a fluorene derivative of structure III wherein $R^3$=H in solution in ethyl ether or other solvents such as tetahydrofuran, isopropyl ether, or methylal, with a Grignard reagent ($R^2MgHal$) such as $CH_3MgI$, in ethyl ether to form a compound of the structure IV 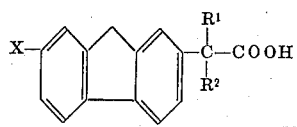

wherein $R^1$ is hydroxyl.

Compounds corresponding to compound IV wherein $R^1$ is lower alkyl or cycloalkyl can be prepared as follows: esters of compounds of the type IV where $R_1$ is hydrogen are alkylated with an alkyl halide or cycloalkyl halide in dimethylformamide or diglyme in the presence of a base such as sodium hydride.

Compounds of the structure I wherein Y is

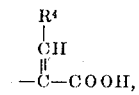

i.e., α-methylene fluorene-2-acetic acid, can be prepared by reacting an α-substituted-α-hydroxyfluorene-2-acetic acid of structure IV containing a hydrogen on the carbon vicinal to the hydroxyl group with a mineral acid such as hydrochloric acid or sulfuric acid in dioxane or other solvent such as tetrahydrofuran.

Compounds of structure I wherein Y is

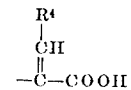

can also be prepared by reacting compounds of structure III in a Wittig reaction with a substituted triphenylphosphonium halide such as methyltriphenylphosphonium bromide.

Compounds of formula I wherein Y is

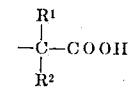

wherein $R^1$ is hydrogen can be prepared by catalytic hydrogenation of the above compounds.

In addition, in accordance with the present invention, compounds of the structure V 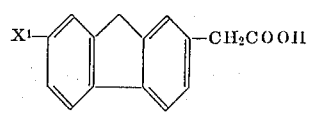

are provided wherein $X^1$ is hydroxyl, lower alkyl, lower alkoxy, trifluoromethyl, fluorine and bromine.

Compounds of structure V can be prepared by reacting a 7-substituted fluorene-2-glyoxylic acid or ester of structure III and fluorene-2-glyoxylic acid with hydrazine or hydrazine hydrate in a modified Wolf-Kishner reaction at a temperature within the range of from about $130°$ to about $180°C$ until solution is achieved, cooling the solution to a temperature within the range of from about $50°$ to about $60°C$ and treating the cooled solution with a base such as an alkali metal hydroxide or alkoxide such as potassium hydroxide or sodium ethoxide.

In preparing compounds of structure V, the fluorene compound is employed in a molar ratio to the hydrazine compound of within the range of from about 0.01:1 to about 0.2:1 and preferably from about 0.01:1 to about 0.05:1. The base is employed in a molar ratio to the fluorene compound of within the range of from about 0.15:1 to about 0.3:1 and preferably from about 0.2:1 to about 0.25:1.

Compounds of the structure V and compounds of formula I wherein Y is

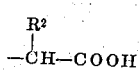

may be prepared by reacting the appropriately substituted fluorene-2-carboxylic acid halide with a diazoalkane to form the corresponding diazoketone followed by a Wolff rearrangement to an ester and hydrolysis.

Compounds of the structure VI

VI 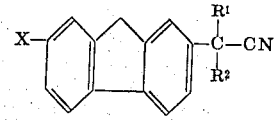

wherein $R^1$ is other than hydroxyl can be prepared by alkylating a 2-fluoreneacetonitrile of the structure VII 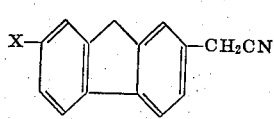

with an alkyl or cycloalkyl halide in the presence of a base such as sodium hydride in an inert solvent such as dimethylformamide or diglyme.

The cyano group of compound VI can be hydrolyzed to a carboxyl group.

Compounds of the structure I wherein Y is

wherein $R_2$ is other than hydrogen can be prepared by reacting a 2-acyl fluorene of the structure VIII 

with an alkali metal cyanide such as sodium cyanide or hydrogen cyanide in an acidic medium.

Compounds of the structure I wherein Y is

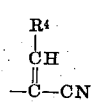

can be prepared by dehydrating an α-hydroxy fluorene-2-acetonitrile of the structure IX 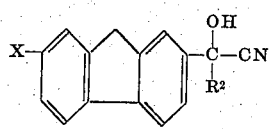

which contains a hydrogen on the carbon vicinal to the hydroxyl group with a mineral acid or with phosphorous oxychloride in a suitable solvent. The resulting compounds of the structure X 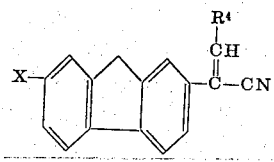

can be converted to the corresponding carboxylic acids XI by catalytic hydrogenation followed by basic hydrolysis.

XI 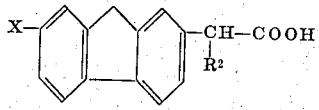

Compounds of formula I wherein Y is

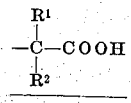

or $-CH_2COOH$ can be converted to the corresponding 7-hydroxylated compounds by fermentation in the presence of an appropriate organism.

The enzymatic 7-hydroxylation can be accomplished either by including the substrate or fluorene in a growing or mature culture of an appropriate microorganism, or by treating the substrate with the cells, spores or mycelium of such a culture separated from the growth medium or hydroxylating enzymes separated from cells of such microorganisms.

Suitable microorganisms for hydroxylation include members of the genera: Aspergillus (e.g., *A. ochraceus, A. nidulans, A. higher*), Rhizopus (e.g., *R. arrhizus*), Syncephalstrum (e.g., *S. racemosum*), Thamnidium (e.g., *T. elegans*), Mucor (e.g., *M. adriaticus*), Trichothecium (e.g., *T. roseum*), Phycomyces (e.g., *P. nitens*), Penicillium (e.g., *P. expansum*), Blakeslea (e.g., *B. trispora*), Cercospora (e.g., *C. melonis*), Cunninghamella (e.g., *C. blakesleeana*), Botrytis (e.g., *B. cinerea*), or Corticium (e.g., *C. sasaki*).

If the microorganism is used per se, it is grown aerobically in a suitable nutrient medium, as known in the art; the substrate being added either at the beginning or sometime during the culturing process.

In general, the conditions of culturing the microorganisms for the purpose of this invention are the same as those of culturing microorganisms for the production of antibiotics or vitamins. Thus, the microorganism is grown in contact with (in or on) a suitable nutrient medium in the presence of an adequate supply of oxygen (air). A suitable nutrient medium essentially comprises a source of nitrogenous factors and an assimilable source of carbon and energy. The latter may be a carbohydrate, such as sucrose, molasses, glucose, maltose, starch or dextrin. The source of nitrogenous factors may be organic (e.g., soybean meal, corn steep liquor, meat extract, distillers solubles, peptones and/or yeast extract) or synthetic (i.e., composed of simple, synthesizable organic and inorganic compounds such as ammonium salts, alkali nitrates, amino acids or urea).

The acid substrate, in aqueous, aqueous alcoholic solution or dimethylformamide solution, is added either prior to or during the culturing of the microorganism, if the microorganism is used per se, or to an aqueous medium containing the separated cells, spores or cell-free hydroxylating enyme, if this procedure is employed. After about 1 to about 200 hours, depending on the concentration of this acid and enzyme, the reaction is substantially complete. The resulting 7-hydroxylated derivative can then be recovered by filtration or centrifugation (if solid) or by countercurrent extraction.

These 7-hydroxylated compounds can also be prepared from the corresponding 7-amino compounds by diazotization as described hereinbefore.

The fluorene-2-acetic acid derivatives of the invention form salts with organic bases, e.g. alkylamines such as methylamine, ethylamine, isopropylamine, glucamine, aniline, dimethylamine, etc., heterocyclic amines such as piperidine, morpholine, and the like, and with inorganic bases, e.g., ammonium hydroxide, alkali metal hydroxides such as sodium hydroxide, potassium hydroxide, etc., alkaline earth metal hydroxides such as calcium hydroxide, magnesium hydroxide, etc., alkali metal carbonates and bicarbonates such as sodium carbonate, potassium bicarbonate, etc. These basic salts may be used in the preparation and/or isolation of the products of this invention. When the product is produced in the form of the basic salt, neutralization with an acid, e.g., a mineral acid such as hydrochloric acid, or organic acid such as citric acid, will yield the compound in the acid form. Other basic salts may then be formed by reaction with the appropriate organic or inorganic base.

The compounds of this invention are useful as anti-inflammatory agents and are effective in the prevention and inhibition of granuloma tissue formation in warm blooded animals, for example, in a manner similar to indomethacin. They may be used to decrease joint swelling tenderness, pain and stiffness, in mammalian species, e.g., in conditions such as rheumatoid arthritis. A compound of this invention or a physiologically-acceptable salt of the character described above may be compounded according to accepted pharmaceutical practice in oral dosage forms such as tablets, capsules, elixirs or powders for administration of about 100 mg to 2 gm per day, preferably 100 mg to 1 gm per day, in two to four divided doses. For example, about 150 mg/kg/day is effective in reducing paw swelling in rats.

The compounds of the invention can also be employed as sun-screening agents and as intermediates for reaction with 6-aminopenicillanic acid 7-aminocephalosporanic acid to produce new useful penicillins and cephalosporins.

The following examples represent preferred embodiments of the present invention.

EXAMPLE 1

Ethyl fluorene-2-glyoxylic acid

A suspension of aluminum chloride (75 g) in ethylene dichloride (200 ml) is cooled to 5° and treated dropwise over a 1 hour period with a solution of ethyl oxalyl chloride (50 g) and fluorene (53.6 g) in ethylene dichloride (200 ml), while maintaining the temperature below 10°. The reaction mixture is then stirred at room temperature (4 hours). The mixture is then poured into ice-water, acidified to pH 2.0 with 10% HCl and extracted with ether. The ether extracts are washed with water, dried (MgSO$_4$) and evaporated to give the title compound (86 g, mp 81°–82°). The analytical sample is prepared by recrystallization from methanol: mp 81°–82°.

| Anal. Calcd. | C, 76.67; | H, 5.30 |
|---|---|---|
| Found | C, 76.56; | H, 5.35 |

EXAMPLES 2 TO 5

By reacting ethyl oxalyl chloride with the 2-substituted fluorenes shown in the left hand column of Table I in accordance with the procedure of Example 1, the fluorene-2-glyoxylic acid esters shown in the right hand column of Table I are obtained.

TABLE I

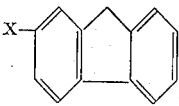

| Ex. | X | X |
|---|---|---|
| 2 | CH$_3$ | CH$_3$ |
| 3 | 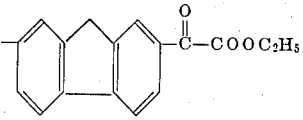 |  |
| 4 | OC$_2$H$_5$ | OC$_2$H$_5$ |
| 5 | Cl | Cl |

EXAMPLE 6

Fluorene-2-glyoxylic acid

A mixture of ethyl fluorene-2-glyoxylic acid (9.95 g) and sodium hydroxide (1.60 g) in 50% aqueous ethanol (100 ml) is refluxed for 0.5 hour, cooled and acidified to pH 2.0 with 10% HCl. The reaction mixture is extracted with ether, and the ether extracts dried (MgSO$_4$) and evaporated. The residue is crystallized from benzene-hexane (Darco) to give the title compound (7.1 g, mp 135°–137°). The analytical sample is prepared by recrystallization from benzenehexane: mp 139°–140°.

| Anal. Calcd. | C, 75.62; | H, 4.23 |
|---|---|---|
| Found | C, 75.76; | H, 4.47 |

EXAMPLES 7 TO 10

Following the procedure of Example 6, but substituting the 7-substituted fluorene-2-glyoxylic acid esters of Examples 2 to 5 for the ethyl fluorene-2-glyoxylic acid, the corresponding 7-substituted fluorene-2-glyoxylic acids are produced, namely

TABLE IA

| Example | X |
|---|---|
| 7 | CH$_3$ |
| 8 | 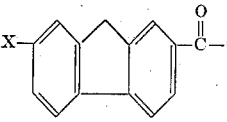 |
| 9 | OC$_2$H$_5$ |
| 10 | Cl |

EXAMPLE 11

Fluorene-2-acetic acid

A suspension of fluorene-2-glyoxylic acid (33.7 g) in hydrazine hydrate (50 ml) is refluxed until solution is achieved, cooled and treated with potassium hydroxide (33.7 g) in portions. The mixture is then refluxed for 1 hour, and the excess hydrazine removed by distillation. The residue is dissolved in water and extracted with chloroform. The aqueous layer is acidified to pH 2.0 with 10% HCl and extracted with ether. The ether extracts are washed, dried ($MgSO_4$) and evaporated to give the title compound (29.7 g, mp 184°–186°).

| Anal. Calcd. | C, 80.33; | H, 5.39 |
|---|---|---|
| Found | C, 80.67; | H, 5.31 |

EXAMPLES 12 TO 14

Following the procedure of Example 11 and reacting the 7-substituted fluorene-2-glyoxylic acid shown in the left hand column of Table II (prepared as described in Examples 6 to 10) with hydrazine hydrate, the 7-substituted fluorene-2-acetic acid shown in the right hand column of Table II is obtained.

Table II

| Example | X' | X' |
|---|---|---|
| 12 | $C_5H_{11}$ | $C_5H_{11}$ |
| 13 | $C_2H_5$ | $C_2H_5$ |
| 14 | $OCH_3$ | $OCH_3$ |

EXAMPLE 15

α-Methyl-α-hydroxyfluorene-2-acetic acid

A cooled solution of fluorene-2-glyoxylic acid (4.5 g) in ether (150 ml) is treated dropwise over a 45 minute period with Grignard reagent prepared from magnesium (2.1 g) and methyl iodide (6.5 ml) in ether (145 ml). The mixture is then stirred for 2 hours at room temperature and poured into ice water. The mixture is treated with 250 ml 50% acetic acid and finally acidified to pH 2.0 with 10% HCl. The ether layer is separated, and the aqueous extracted with additional ether. The combined ether extracts are washed with sodium chloride solution and water, dried ($MgSO_4$) and evaporated to give the title compound (3.7 g. mp 164°–168°). Recrystallization from ethyl acetate-hexane raises the mp to 170°–171°, $\lambda^{KBr}$ 3400 cm$^{-1}$.

| Anal. Calcd. | C, 75.54; | H, 5.55 |
|---|---|---|
| Found | C, 75.28; | H, 5.44 |

EXAMPLES 16 TO 18

By reacting the 7-substituted fluorene-2-glyoxylic acid shown in the left hand column of Table III with the Grignard reagent shown in the middle column, employing the procedure described in Example 15 the α-alkyl-α-hydroxyfluorene-2-acetic acid shown in the right hand column of Table III is obtained.

TABLE III

| Example | X | $R^2$ | Hal | X | $R^2$ |
|---|---|---|---|---|---|
| 16 | $CH_3$ | thienyl | Br | $CH_3$ | thienyl |
| 17 | $OC_2H_5$ | cyclopropyl | Cl | $OC_2H_5$ | cyclopropyl |
| 18 | Cl | $CH_3$ | I | Cl | $CH_3$ |

EXAMPLE 19

α-Methylenefluorene-2-acetic acid

A solution of α-methyl-α-hydroxyfluorene-2-acetic acid (5.7 g) and sulfuric acid (11.4 ml) in dioxane (300 ml) is refluxed for 2 hours. The reaction mixture is poured into ice water and extracted with ether. The ether extracts are washed with water, dried ($MgSO_4$), and evaporated to give the title compound (5.2 g, mp 183°–185°). The analytical sample is prepared by recrystallization from 95% ethanol, mp 190°–191°, $\lambda^{KBr}$ 880 cm$^{-1}$.

| Anal. Calcd. | C, 81.34; | H, 5.12 |
|---|---|---|
| Found | C, 81.10; | H, 5.40 |

EXAMPLES 20

By refluxing a solution of a 7-substituted α-alkyl-α-hydroxyfluorene-2-acetic acid and sulfuric acid in dioxane in accordance with the procedure of Example 19, the corresponding α-alkylenefluorene-2-acetic acid as shown in Table IV below is formed.

Table IV

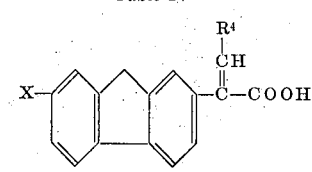

| Example | X | $R^4$ |
|---|---|---|
| 20 | Cl | H |

EXAMPLE 21

α-Methylene fluorene-2-acetic acid

A mixture of sodium hydride (0.48g.) and dimethylsulfoxide (5ml.) is stirred and heated at 70°–80° until the evolution of hydrogen ceases. The cooled solution is treated with methyltriphenylphosphonium bromide (7.14g.) in dimethylsulfoxide (10ml.), stirred for 10 minutes and treated with ethyl fluorene-2-glyoxylic acid (5.32g.). The reaction mixture is stirred for 1 hr., the solvent evaporated and the residue extracted with ether after the addition of water. The ether extracts are washed with water, dried (MgSO$_4$) and evaporated. The residue is hydrolyzed by refluxing it in 50% methanol (50ml.) containing potassium hydroxide (5g.) for 3 hr. The reaction mixture is concentrated, acidified and extracted with ether. The ether extracts are washed with water, dried (MgSO$_4$) and evaporated to give the title compound.

EXAMPLE 22

α-Hydroxy-α-methyl-fluorene-2-acetonitrile

A mixture of 2-acetylfluorene (5.32g.) in ether (20ml.) and water (40ml.) is cooled to 5° and agitated vigorously. Sodium cyanide (2.45g.) is added portionwise and the solution is then treated with conc. HCl (4.8ml.) while maintaining the temperature between 5°–10°. The mixture is then stirred for 2 hr. at room temperature, diluted with water and extracted with ether. The ether extracts are dried (MgSO$_4$) and evaporated to give the titled compound.

EXAMPLES 23 TO 25

By reacting a 2-acyl fluorene as shown in the left hand column of Table V with sodium cyanide and hydrochloric acid in accordance with the procedure of Example 22, the α-hydroxy-fluorene-2-acetonitrile shown in the right hand column of Table V is obtained.

TABLE V

| Ex. | X | R² | X | R² |
|---|---|---|---|---|
| 23 | i-C₃H₇ | (thiophene) | i-C₃H₇ | (thiophene) |
| 24 | OC₂H₅ | (furan) | OC₂H₅ | (furan) |
| 25 | Br | (thiophene) | Br | (thiophene) |

EXAMPLE 26

α-Methylene fluorene-2-acetic acid

The α-hydroxy-α-methyl-fluorene-2-acetonitrile is treated with conc. HCl (50ml.) and this solution is saturated with HCl and allowed to stand overnight. The solution is made alkaline with 50% aqueous sodium hydroxide, and then refluxed until the evolution of ammonia ceases. The solution is acidified and extracted with ether. The ether extracts are washed with water, dried (MgSO$_4$) and evaporated. The residue is dissolved in dioxane (150ml.) and sulfuric acid (5ml.) and refluxed for 2 hr. The reaction mixture is poured into ice water and extracted with ether. After drying and evaporation the title compound is obtained.

EXAMPLES 27 TO 29

By reacting the 2-fluorene-hydroxyacetonitriles produced hereinbefore (and shown in Table VI) by the procedure of Example 26, the corresponding α-alkylene fluorene-2-acetic acid is obtained as shown in Table VI below.

TABLE VI

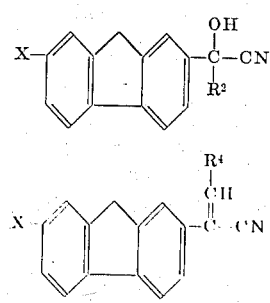

| Example | X | R² | X | R⁴ |
|---|---|---|---|---|
| 27 | t—C₄H₉ | C₇H₁₅ | t—C₄H₉ | C₆H₁₃ |
| 28 | OCH₃ | C₉H₁₉ | OCH₃ | C₈H₁₇ |
| 29 | Cl | C₁₁H₂₃ | Cl | C₁₀H₂₁ |

EXAMPLE 30

α-Methyl fluorene-2-acetic acid

A solution of methylenefluorene-2-acetic acid (2.6g.) in dioxane (50ml.) is hydrogenated in the presence of 5% palladium on charcoal (800mg.). The mixture is filtered and the filtrate evaporated to dryness. The residue is sublimed to afford the title compound (2.6g.). The analytical sample is prepared by recrystallization from aqueous methanol, mp 181°–182°.

| Anal. Calcd. | C, 80.64; | H, 5.92 |
|---|---|---|
| Found | C, 80.46; | H, 5.78 |

EXAMPLES 31

By hydrogenating the α-alkylene fluorene-2-acetic acids prepared hereinbefore according to the procedure of Example 30, the corresponding acid is formed as shown in Table VII below.

TABLE VII

| Example | X | R² |
|---|---|---|
| 31 | Cl | CH₃ |

EXAMPLE 32

α-Methylfluorene-2-acetonitrile

A solution of fluorene-2-acetonitrile (2g.) in dimethylformamide is treated with sodium hydride (415mg.) portionwise while stirring under nitrogen. After the evolution of hydrogen has ceased, the mixture is cooled to 10°–15° and treated dropwise with methyl iodide (2.82g.) in dimethylformamide (10ml.). After stirring for 30 minutes, the ice bath is removed and the mixture stirred at room temperature overnight. The reaction mixture is then poured into ice water and extracted with ether. The ether extracts are washed with water, dried ($MgSO_4$) and evaporated to give the title compound.

EXAMPLES 33 TO 35

By reacting a fluorene-2-acetonitrile as shown in the left hand column of Table VIII below with sodium hydride and an alkyl halide as shown in the middle column, in accordance with the procedure described in Example 48, the product shown in the right hand column of Table VIII is obtained.

TABLE VIII

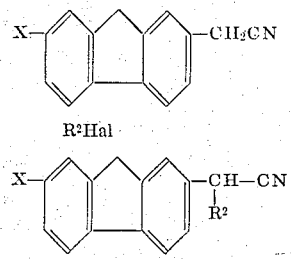

| Example | X | $R^2$ | Hal | X | $R^2$ |
|---|---|---|---|---|---|
| 33 | $C_2H_5$ | $CH_3$ | Cl | $C_2H_5$ | $CH_3$ |
| 34 | $OCH_3$ | $C_2H_5$ | Br | $OCH_3$ | $C_2H_5$ |
| 35 | Br | $t-C_4H_9$ | Cl | Br | $t-C_4H_9$ |

EXAMPLE 36

α-Methylfluorene-2-acetic acid 2.1g. of α-methylfluorene-2-acetonitrile is refluxed in 60% aqueous ethanol (50ml.) containing potassium hydroxide (5g.) until the evolution of ammonia ceases. The ethanol is evaporated and the aqueous solution acidified to pH 2.0 with HCl and extracted with ether. The ether extracts are washed with water, dried ($MgSO_4$) and evaporated to give the title compound.

EXAMPLE 37

α-Methylfluorene-2-acetic acid

Following the procedure of Examples 32 and 36 but substituting methyl α-methylfluorene-2-acetic acid for α-methylfluorene-2-acetonitrile, there is obtained the title compound.

EXAMPLE 38

α-Dimethylfluorene-2-acetic acid

Following the procedures of Examples 32 and 36 but substituting either methyl α-methylfluorene-2-acetic acid or α-methylfluorene-2-acetonitrile for the fluorene-2-acetonitrile there is obtained the title compound.

EXAMPLE 39

α-Methylfluorene-2-acetic acid

A mixture of fluorene-2-carboxylic acid (3g.) in thionyl chloride (10ml.) is refluxed for 3 hr. and then evaporated. The acid chloride in ether (25ml.) is then added dropwise over a 15 minute period to a solution of diazoethane (3.42g.) in ether (175ml.) at −20°. The stirring is continued for an additional 15 minutes and the excess diazoethane removed in vacuo at −20°. The remaining solvent is removed at 0° to give the crude diazoketone. The diazoketone in benzyl alcohol (15ml.) and collidine (5ml.) is heated rapidly to 180°. After the evolution of nitrogen is complete, the cooled solution is extracted with ether. The ether extracts are washed with 10% HCl, water, dried ($MgSO_4$) and evaporated. The ester in 50% methanol (30ml.) containing potassium hydroxide (4g.) is refluxed for 3 hr., concentrated, and extracted with ether. The aqueous phase is acidified and extracted with ether. The ether extracts are washed with water, dried ($MgSO_4$) and evaporated to give the title compound.

EXAMPLE 40

7-Hydroxyfluorene-2-acetic acid

A solution of 14.5g. of methyl 7-aminofluorene-2-acetic acid in 380ml. of water containing 14ml. of concentrated hydrochloric acid is cooled to 2° and a solution of 3.63g. of sodium nitrite in 15ml. of water added dropwise while stirring. The diazonium solution is added over a 1 hour period while stirring to a refluxing solution of 1.1 liters of water containing 18ml. of sulfuric acid. The mixture is cooled and the solid collected by filtration. The solid is refluxed with 120ml. of 10% aqueous potassium hydroxide solution for 2 hr., and treated with Darco. The suspension is filtered, acidified with hydrochloric acid and the solid collected by filtration, dried, and crystallized from acetonitrile to give 9.4g. of the title compound, 240°–241°d.

EXAMPLE 41

7-Hydroxyfluorene-2-acetic acid

A. Fermentation

Surface growth from a two week old agar slant of *Aspergillus niger* (ATCC-9142), the slant containing as nutrient medium (A):

| | Grams |
|---|---|
| Glucose | 10 |
| Yeast Extract | 2.5 |
| $K_2HPO_4$ | 1 |
| Agar | 20 |
| Distilled Water to One Liter | | is suspended in 5ml. of 0.01% aqueous sodium lauryl sulfate solution. One ml. portions of this suspension are used to inoculate three 250ml. Erlenmeyer flaskes, each containing 50ml. of the following sterilized medium (B):

| | Grams |
|---|---|
| Glucose | 30 |
| Soy Bean Meal | 20 |
| Soy Bean Oil | 2.0 |
| $CaCO_3$ | 2.5 |
| Distilled Water to One Liter | |

After approximately 96 hours incubation at 25°C with continuous rotary agitation (280 cycles/minute;

two inch stroke), 5% (vol/vol) transfers are made to twenty 250ml. Erlenmeyer flasks each containing 50ml. of the following sterilized medium (C):

|  | Grams |
|---|---|
| Corn Steep Liquor | 6 |
| $NH_4H_2PO_4$ | 3 |
| Yeast Extract | 2.5 |
| Dextrose | 10 |
| $CaCO_3$ | 2.5 |
| Distilled Water to One Liter | |

After 24 hours of incubation, using the same conditions as described above, substrate (200 micrograms/ml.) is then added by supplementing each flask with 0.25ml. of a sterile solution (40mg./ml.) of fluorene-2-acetic acid in N,N-dimethylformamide. A total of 200mg. of fluorene-2-acetic acid is fermented.

After approximately six days of further incubation using identical conditions as described above the contents of the flasks are pooled and the broth is adjusted to pH 2.5 with 12N $H_2SO_4$. The acidified broth is then filtered through a Seitz clarifying pad. The flasks, mycelium and pad are washed with successive 100ml. portions of warm water. The combined filtrate and washings have a volume of 1500ml.

B. Isolation

The thus obtained filtrate is extracted with ethyl acetate. The extracts are washed with 8% salt solution, dried and evaporated. The residue is crystallized from ethyl acetate to give 42mg. of the title compound, mp 235.5°– 237.5°d. The analytical sample is prepared by recrystallization from ethyl acetate, mp 236°–238°d; $\lambda^{KBr}$ 5.84$\mu$; $\tau_{DMSO}^{TMS}$ $\tau$6.44 (S,2.$\underline{CH_2}$—$CO_2H$) and 6.23 (S,9—$\underline{CH_2}$).

| Anal. Calcd. for $C_{15}H_{12}O_3$: | C, 74.99; | H, 5.03 |
|---|---|---|
| Found: | C, 74.72; | H, 4.80 |

EXAMPLE 42

Methyl 7-Hydroxyfluorene-2-acetic acid

A solution of 83mg. of 7-hydroxyfluorene-2-acetic acid in 2ml. of methanol and 5ml. of ether is treated with an excess of diazomethane in ether. After 20 min. at room temperature, the mixture is treated with several drops of acetic acid and evaporated. The residue is plate chromatographed on silica gel using chloroform as the developing solvent. The major band (UV) is eluted with ethyl acetate, evaporated, and the residue crystallized from acetone-isopropyl ether to give 36mg. of the title compound, mp 135.5°–136.5°. The analytical sample is prepared by recrystallization from acetone-isopropyl ether, mp 136°–137°; $\lambda^{KBr}$ 5.85$\mu$; $\tau_{CDCl_3}^{TMS}$ 6.31 (S, 2—$CH_2CO_2\underline{CH_3}$).

| Anal Calcd. for $C_{16}H_{14}O_3$: | C, 75.57; | H, 5.55 |
|---|---|---|
| Found: | C, 75.72; | H, 5.75 |

EXAMPLE 43

Methyl 7-Methoxyfluorene-2-acetic acid

A mixture of 59mg. of methyl 7-hydroxyfluorene-2-acetic acid, 1.3g. of potassium carbonate, and 0.5ml. methyl iodide in 11ml. of acetone is refluxed for 22 hr., filtered and the solid washed with additional acetone. The filtrate is evaporated and the residue plate chromatographed on silica gel employing chloroform-hexane (2:1) as the developing solvent. Elution of the least polar band with ethyl acetate, evaporation and crystallization of the residue from ethyl acetate-isopropyl ether gives 17mg. of the title compound, mp 114°–115°. Recrystallization from ethyl acetate-isopropyl ether gives the analytical sample, mp 114.5°–115.5°; $\lambda^{KBr}$ 5.80$\mu$.

| Anal Calcd. for $C_{17}H_{16}O_3$: | C, 76.10; | H, 6.01 |
|---|---|---|
| Found: | C, 75.90; | H, 6.13 |

EXAMPLE 44

7-Methoxyfluorene-2-acetic acid

A solution of 20mg. of methyl 7-methoxyfluorene-2-acetic acid in 7ml. of ethanol containing 0.5ml. of 50% aqueous potassium hydroxide solution is refluxed overnight. The mixture is acidified and the solid collected by filtration. Crystallization from chloroform-isopropyl ether gives 8mg. of the title compound, mp 200–202°. The analytical sample is prepared by tube to tube evaporative distillation, mp 203–205°; $\lambda^{KBr}$ 5.93$\mu$.

| Anal Calcd. for $C_{16}H_{14}O_3$: | C, 75.57; | H, 5.55 |
|---|---|---|
| Found: | C, 75.79; | H, 5.75 |

EXAMPLE 45

2-(7-Methoxy-2-fluorenyl)propionic acid

Following the procedures outlined in the four previous examples, but substituting α-methylfluorene-2-acetic acid for fluorene-2-acetic acid there is obtained the title compound.

1. The compound having the structure

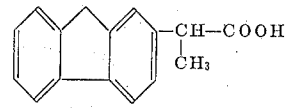

* * * * *

UNITED STATES PATENT OFFICE
CERTIFICATE OF CORRECTION

Patent No. 3,859,340　　　　　　　Dated January 7, 1975

Inventor(s) Eric T. Stiller, et al

It is certified that error appears in the above-identified patent and that said Letters Patent are hereby corrected as shown below:

Column 4, lines 30 to 35, structure 29, should be:

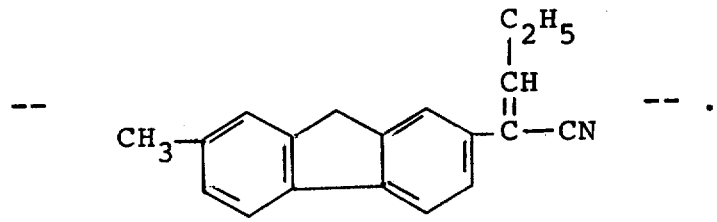

Column 8, line 39, the word "*higher*" should be: -- *niger* --.

Column 9, line 6, the word "enyme," should be: -- enzyme, --.

Column 9, line 52, after the word "acid" insert the word: -- and --.

Column 14, line 39, the line should read: -- A solution of α-methylenefluorene-2-acetic acid --.

Column 18, line 52, before Claim 1 insert the following: -- What is claimed is: --.

Signed and sealed this 18th day of March 1975.

(SEAL)
Attest:

RUTH C. MASON
Attesting Officer

C. MARSHALL DANN
Commissioner of Patents
and Trademarks